United States Patent
Pfeiffer

(10) Patent No.: US 6,404,528 B1
(45) Date of Patent: Jun. 11, 2002

(54) RECEIVER FOR AN OPTICAL COMMUNICATIONS SYSTEM AND METHOD FOR OPERATING SUCH A SYSTEM

(75) Inventor: Thomas Pfeiffer, Stuttgart (DE)

(73) Assignee: Alcatel, Paris (FR)

(*) Notice: Subject to any disclaimer, the term of this patent is extended or adjusted under 35 U.S.C. 154(b) by 0 days.

(21) Appl. No.: 09/085,517

(22) Filed: May 27, 1998

(51) Int. Cl.[7] .................. H04B 10/00; H04B 10/06
(52) U.S. Cl. .................. 359/189; 359/136; 359/138
(58) Field of Search .................. 359/193, 136, 359/138, 189

(56) References Cited

U.S. PATENT DOCUMENTS

| | | | |
|---|---|---|---|
| 4,841,519 A | | 6/1989 | Nishio |
| 5,469,288 A | | 11/1995 | Onaka et al. |
| 5,594,577 A | * | 1/1997 | Majima ............ 359/124 |
| 5,742,241 A | * | 4/1998 | Mizutani .......... 359/156 |
| 5,903,393 A | * | 5/1999 | Kalibjian ......... 359/618 |

FOREIGN PATENT DOCUMENTS

| | | |
|---|---|---|
| DE | 3907497 | 9/1990 |
| EP | 0240124 | 10/1987 |
| EP | 0536025 | 4/1993 |

OTHER PUBLICATIONS

"Introduction to Radar Systems", McGraw–Hill Book Co., Inc. Tokyo 1962 pp. 129–141 by Merrill I. Skolnik.

* cited by examiner

*Primary Examiner*—Jason Chan
*Assistant Examiner*—Agustin Bello
(74) *Attorney, Agent, or Firm*—Ware, Fressola, Van Der Sluys & Adolphson LLP

(57) ABSTRACT

A receiver is disclosed for receiving coded optical a signals in an optical asynchronous communications system using a CDMA method based on periodic spectrum encoding. It has a first optical detector unit (PD1) and a second optical detector unit (PD2) which are preceded by a first periodic optical filter (Rx1) and a second periodic optical filter (Rx2), respectively. The roundtrip time of the second filter (Rx2) is shifted by approximately one quarter of the lightwave period of the received signal with respect to the roundtrip time of the first filter (Rx1). The inputs of the filters (Rx1, Rx2) are connected to the communications system through an optical splitter (KOP). The amplitudes of the outputs of the two filters are squared by means of two squarers (Q1, Q2) and added by means of an adder (AD). This makes the receiver (R) less sensitive to any drift of the filter transfer function.

5 Claims, 7 Drawing Sheets

RECEIVER FOR AN OPTICAL COMMUNICATIONS SYSTEM AND METHOD FOR OPERATING SUCH A SYSTEM

TECHNICAL FIELD

This invention relates to an optical receiver for an optical communications system a receiver for an optical communications system for transmitting coded optical signals, comprising a first optical detector unit preceded by a first periodic optical filter. The invention also relates and to a method for operating the communications system comprising the steps of coding the optical signal in a transmitter by means of a transmitter filter and decoding it and converting it to a first electric signal in a receiver by means of a first periodic optical filter and a first detector unit, respectively.

BACKGROUND OF THE INVENTION

In a paper by L. Möller, "An Optical CDMA Method Based on Periodic Spectrum Encoding", presented at the Thirteenth Annual Conference on European Fibre Optic Communications and Networks, Brighton, England, 1995, pp. 178–181, an asynchronous transmission system is described which uses a CDMA (code-division multiple access) method based on periodic spectrum encoding. In that system, the code words used for gaining access are implemented by different transfer functions of periodic filters. The method uses a particular periodic spectral filtering technique for wideband optical signal sources. An information signal can be received and processed in a receiver only if the periodicities of the filter transfer functions of the transmitter and receiver match.

A disadvantage of this method is that the periodicities of the transmitter and receiver filter transfer functions must match with a high degree of accuracy (order of $10^{-5}$, relative). This results in a complex, controlled filter arrangement to compensate for drifts of the transfer function of the receiver filter caused by, e.g., changes in temperature.

SUMMARY OF THE INVENTION

It is therefore an object of the present invention to provide a receiver for an optical communications system of the above kind in which less stringent requirements must be placed on the stability of the filter transfer function. A further object is to provide a method of transmitting signals in such a communications system.

The first-mentioned object is attained by a receiver for an optical communications system for transmitting coded optical signals, comprising a first optical detector unit preceded by a first periodic optical filter, wherein the receiver has a second periodic optical filter whose roundtrip time is shifted with respect to the roundtrip time of the first filter by approximately one quarter of the mean lightwave period of the received signal, an optical splitter via which the inputs of the first and second filters are connected to the input of the receiver, a second optical detector unit following the second periodic optical filter, two squarers, each following a respective one of the two optical detector units, for squaring the amplitudes of the respective signals applied to them, and an adder for adding the output signals of the two squarers.

This object is also attained by a receiver for an optical communications system for transmitting coded optical signals, comprising of transmitting coded optical signals in an optical communications system, comprising the steps of coding the optical signal in a transmitter by means of a transmitter filter and decoding it and converting it to a first electric signal in a receiver by means of a first periodic optical filter and a first detector unit, respectively, wherein prior to the decoding, the coded optical signal is split up by means of an optical splitter and fed to the first periodic optical filter and a second periodic optical filter whose roundtrip time is shifted with respect to the roundtrip time of the first optical filter by approximately one quarter of the mean lightwave period of the received signal, that the signal portion filtered in the second periodic optical filter is converted into a second electric signal by means of second detector unit, that the amplitudes of the first and second electric signals are squared by means of a first squarer and a second squarer, respectively, and that the two squared electric signals are added by means of an adder. an optical detector unit preceded by a periodic optical filter, wherein the receiver has a modulator (MOD) for modulating the transfer function of the filter (Rx) at a frequency greater than the bit rate of the received signals, and the further object is attained by a method of transmitting coded optical signals in an optical communications system, comprising the steps of coding the optical signal in a transmitter by means of a transmitter filter and decoding it and converting it to a first electric signal in a receiver by means of a first periodic optical filter and a first detector unit, respectively, wherein prior to the decoding, the coded optical signal is split up by means of an optical splitter and fed to the first periodic optical filter and a second periodic optical filter whose roundtrip time is shifted with respect to the roundtrip time of the first optical filter by approximately one quarter of the mean lightwave period of the received signal, that the signal portion filtered in the second periodic optical filter is converted into a second electric signal by means of second detector unit, that the amplitudes of the first and second electric signals are squared by means of a first squarer and a second squarer, respectively, and that the two squared electric signals are added by means of an adder.

Both alternative solutions are based on the idea to provide means for achieving a smaller decrease in received power when the receiver filter is detuned relative to a nominal transfer function, such that in case of such detuning, the received power will pass not through the tuning curve with numerous sharp minima and maxima, but only through the envelope of this curve.

One advantage of the invention is that the filter only needs to be stable within approximately ±1%, so that the filter stability requirement is reduced by at least two orders of magnitude.

Another advantage lies in the fact that in the arrangement according to the invention, no active control of the filter is necessary for stabilizing the filter transfer function. This reduces the complexity and cost of the arrangement.

BRIEF DESCRIPTION OF THE DRAWINGS

The invention will become more apparent from the following description of embodiments when taken in conjunction with the accompanying drawings, in which.

BEST MODE FOR CARRYING OUT THE INVENTION

Figure 1:
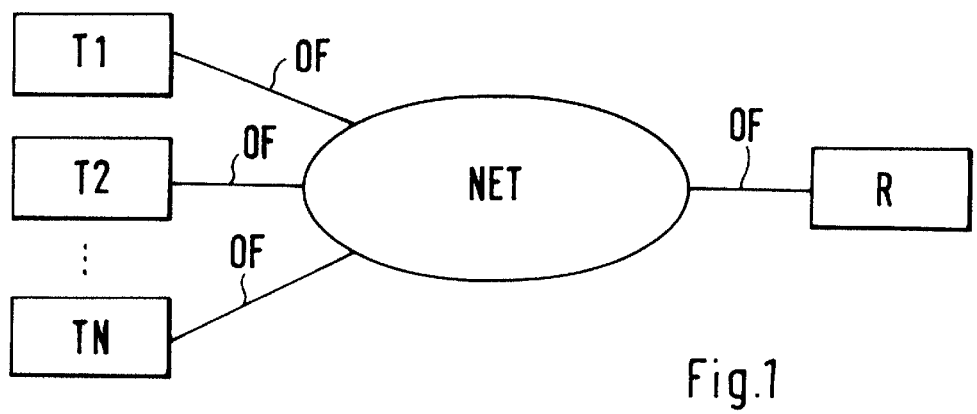
FIG. 1 shows an optical communications system with a plurality of transmitters and one receiver.

Referring to FIG. 1, there is shown an optical communications system with N optical transmitters T1, ..., TN and one optical receiver R which are interconnected by an optical communications network NET and optical fibers OB. The communications system may also comprise further optical receivers.

In the communications system, optical signals are transmitted in coded form. The coding is performed in the transmitter by filtering light signals modulated with the message to be transmitted. This is done using a periodic filter, such as a Fabry-Perot interferometer or a Mach-Zehnder interferometer. Decoding in the receiver is accomplished by filtering the received signals with a similar filter. To obtain a signal at the output of the receiver filter, the periodicities of the transfer functions of the transmitter filter and receiver filter must match. To accomplish this, it is advantageous if the filters of the transmitter and receiver are polarization-independent.

In this arrangement, all transmitters can transmit information signals simultaneously and asynchronously in the same frequency band, which can then all be received independently of each other by one or more receivers. The arrangement thus uses a code division multiple access (CDMA) technique, with the code for accessing a particular signal being realized by the transfer functions of the periodic filters in the transmitter and receiver. To accomplish this, the individual transmitters must use respective filter transfer functions with different periodicities so as not to interfere with the code of another transmitter. In the following, the individual information signals of different transmitters will be referred to as channels.

Figure 2:
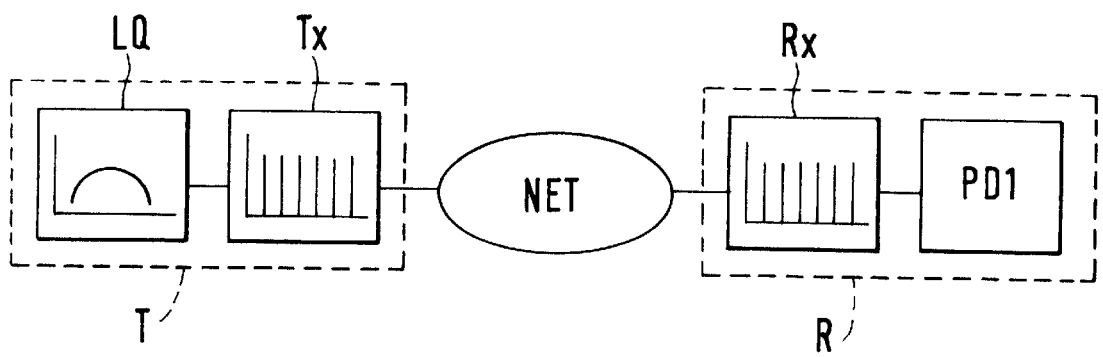
FIG. 2 shows an optical communications system with one transmitter and one receiver.

A transmitter T and a receiver R which are interconnected through the communications network NET are shown in more detail in FIG. 2. The transmitter T contains a directly modulated broadband signal light source LQ, for example a multimode laser with a wavelength spectrum from 1520 to 1580 nm or a light-emitting diode (LED), and a filter Tx. The receiver contains a filter Rx followed by an optical detector unit PD1, for example a photodetector or a photodiode. In conventional receivers, it is necessary for the filter to be stable against variations of its transfer function to an accuracy of about $10^{-5}$ if interference-free reception of the signal transmitted by the transmitter T is to be possible.

Figure 3:
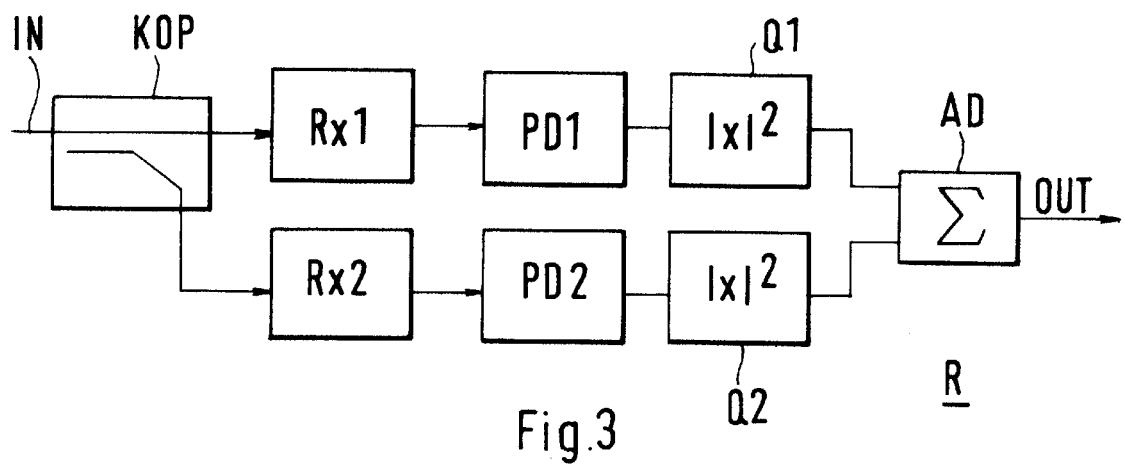
FIG. 3 shows a block diagram of a receiver according to the invention.

A first embodiment of a receiver R according to the invention is shown in FIG. 3. In this arrangement, an incoming signal is split by a splitter KOP at the input IN into two portions. The splitter KOP is connected to two optical filters Rx1, Rx2, such that each of the optical filters Rx1, Rx2 receives one of the two signal portions. The optical filters Rx1, Rx2 are so detuned relative to each other that the roundtrip time $\tau_{Rx2}$ of the second filter Rx2 differs from the roundtrip time $\tau_{Rx1}$ of the first filter Rx1 by approximately one quarter of the mean lightwave period of the received signal.

The filter Rx may be a Fabry-Perot interferometer, which consists of optically flat and parallel, partially silvered glass plates, or a Mach-Zehnder interferometer, e.g., an interferometer based on lithium niobate ($LiNbO_3$). It is also possible to use a Michelson interferometer, an arrayed waveguide grating, or a Lyot filter.

The roundtrip time is a characteristic of the filter. In the case of the Fabry-Perot interferometer, it describes the optical-path difference of a lightwave between the two reflecting surfaces of the interferometer, i.e., the difference between the transit times of a lightwave reflected back and forth once between the reflecting surfaces and a directly transmitted lightwave. In the case of the Mach-Zehnder interferometer, the roundtrip time is the transit-time difference of a lightwave between the two interferometer arms. Since a particular spectral range, for example 1520 to 1580 nm, is used for communication, a precise shift of the roundtrip time of the second filter with respect to that of the first is not necessary. In the wavelength range mentioned by way of example, a roundtrip-time difference of 1.28 fs (corresponds to one quarter lightwave period at 1550 nm) would be optimal. However, differences within tolerance ranges of 1.3 fs ±10% and, with tolerable losses of insensitivity to filter detuning, of 1.3 fs ±20% are sufficient. (1500 nm corresponds to a lighwave period of 5 fs, and 1600 nm to a lightwave period of 5.33 fs).

Figure 4:
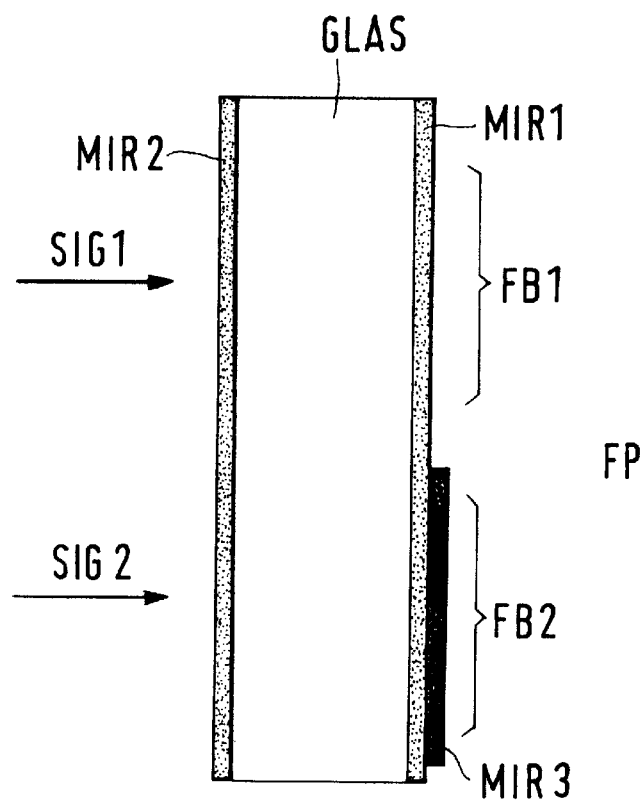
FIG. 4 shows the filter of the receiver of FIG. 3.

In the first embodiment, this roundtrip-time difference is achieved as shown in FIG. 4. Use is made of a single Fabry-Perot interferometer FP which has a first filter section FB1 and a second filter section FB2, forming the first and second filters Rx1 and Rx2, respectively. It consists of a glass plate GLAS provided on both sides with a partially transmitting coating MIR1, MIR2. In the second filter section FB2, one side of the glass plate is provided with a third coating MIR3 of a material having the same refractive index, with the thickness of the third coating chosen so that a transit-time difference of, e.g., 1.3 fs is obtained. This Fabry-Perot interferometer FP is so positioned in the beam path in the receiver R that each of the two signal portions SIG1, SIG2 coming from the splitter KOP will strike a respective one of the two filter sections FB1, FB2.

The two filters Rx1 and Rx2 in FIG. 3 are followed by detector units PD1 and PD2, respectively, for example photodiodes, which convert the optical signals to electric ones. Connected to the outputs of the two detector units PD1 and PD2 are squarers Q1 and Q2, respectively, which square the amplitudes of the two output signals. A subsequent adder AD adds the two squared output signals from the two squarers Q1, Q2. The result is an output signal modulated with the message to be transmitted, OUT, which is extremely insensitive to changes in the transfer functions of the two filters. It will be sufficient if the filters are stable within ±1%; only the difference between the roundtrip times of the two filters must remain within the limits specified above.

Figure 5:
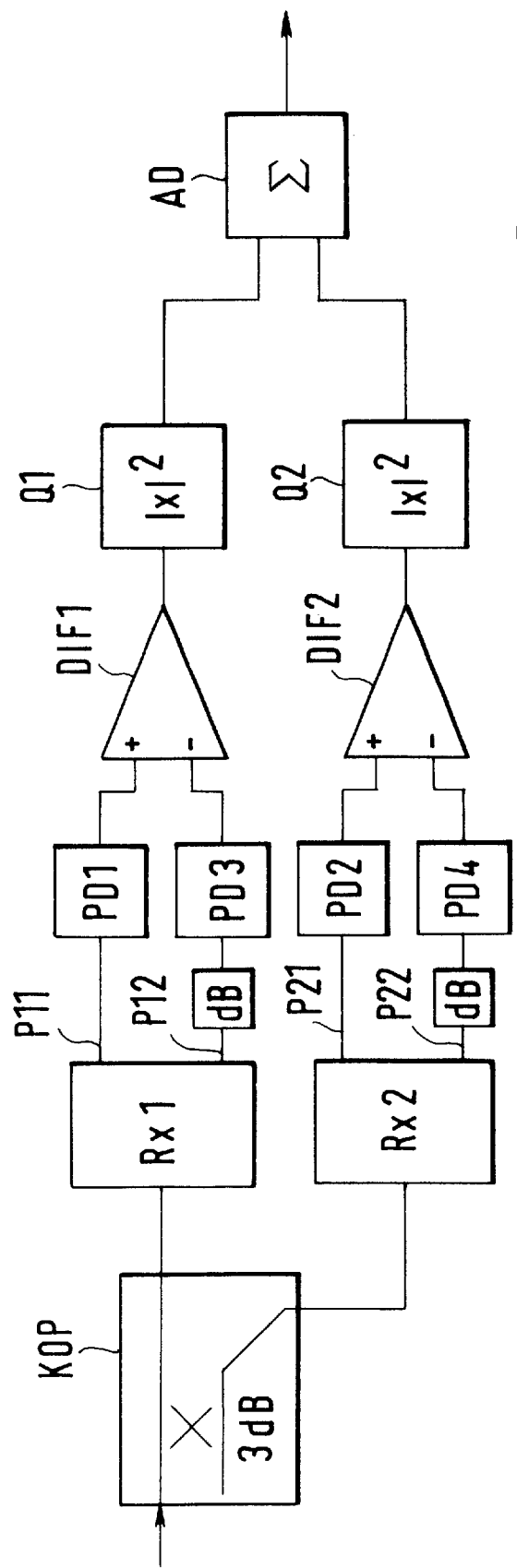
FIG. 5 shows a development of the receiver of FIG. 3.

A development of the arrangement of FIG. 3 is shown in FIG. 5. Here, the first and second filters Rx1 and Rx2 are filters with two outputs P11, P12 and P21, P22 which provide respective complementary output signals. "Complementary" as used herein means that the sum of the two output signals is equal to the input signal of the respective filter. The two output signals of each of the two filters are converted to electric signals by separate detector units PD1, PD3 and PD2, PD4. The two electric signals, generated from the respective complementary output signals of the filters Rx1 and Rx2, are then subtracted from one another in differential amplifiers DIF1 and DIF2, respectively. This has the advantage that crosstalk from other channels is reduced. By means of a variable attenuator dB connected between the second output of each filter and the respective detector unit, crosstalk can be compensated for in a particularly effective manner.

If a Fabry-Perot interferometer is used, the two complementary output signals are the tranmitted and reflected portions of the input signal received from the splitter KOP. The reflected portion may be extracted from the optical fiber connected to the input IN by means of a further splitter (not shown). If a Mach-Zehnder interferometer with two output arms is employed, the two complementary output signals are the portions of the received signal from the two output arms.

Figure 6:
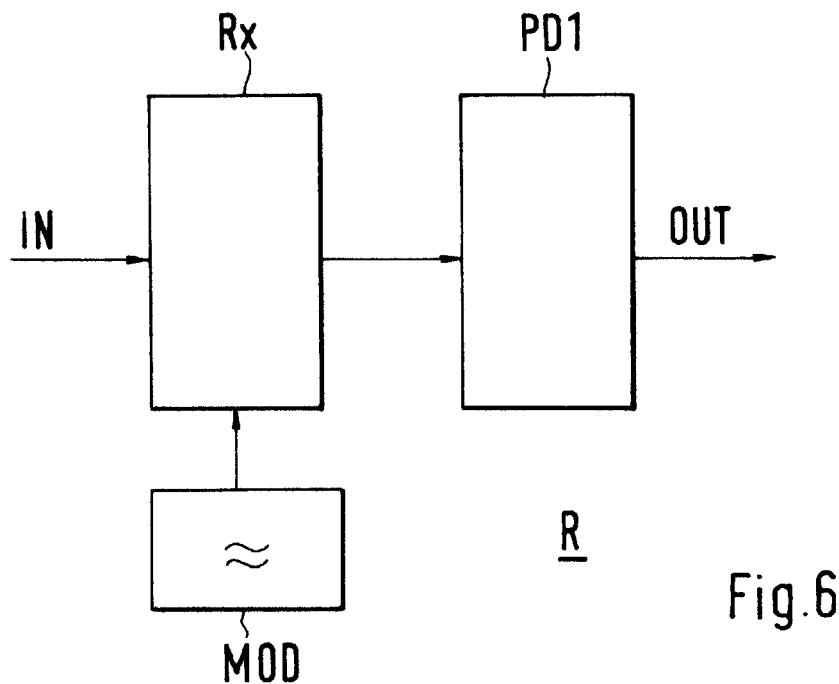
FIG. 6 shows a block diagram of another receiver according to the invention.

A second embodiment of the receiver according to the invention is shown in FIG. 6. In this receiver R, too, the filter transfer function needs to be stable within only about ±1%. The filter Rx ahead of the detector unit PD1 is connected to a modulator MOD which modulates the transfer function of the filter Rx at a frequency f greater than the bit rate of received signals. The detector unit PD1 delivers an electric signal modulated with the transmitted message.

The filter Rx may be a Fabry-Perot interferometer consisting of optically flat and parallel, partially reflecting glass plates between which a piezoelectric device is provided as a spacer. By applying a sinusoidal modulating voltage to the piezoelectric device, the distance between the glass plates is varied, whereby the transfer function of the filter is modulated. Another possibility is to use a Mach-Zehnder interferometer, for example an interferometer based on lithium niobate ($LiNbO_3$) in which the optical path length in one of the interferometer arms can be varied by applying a modulating voltage. With this variant, too, a modulation of the filter transfer function is achieved.

Figure 7:
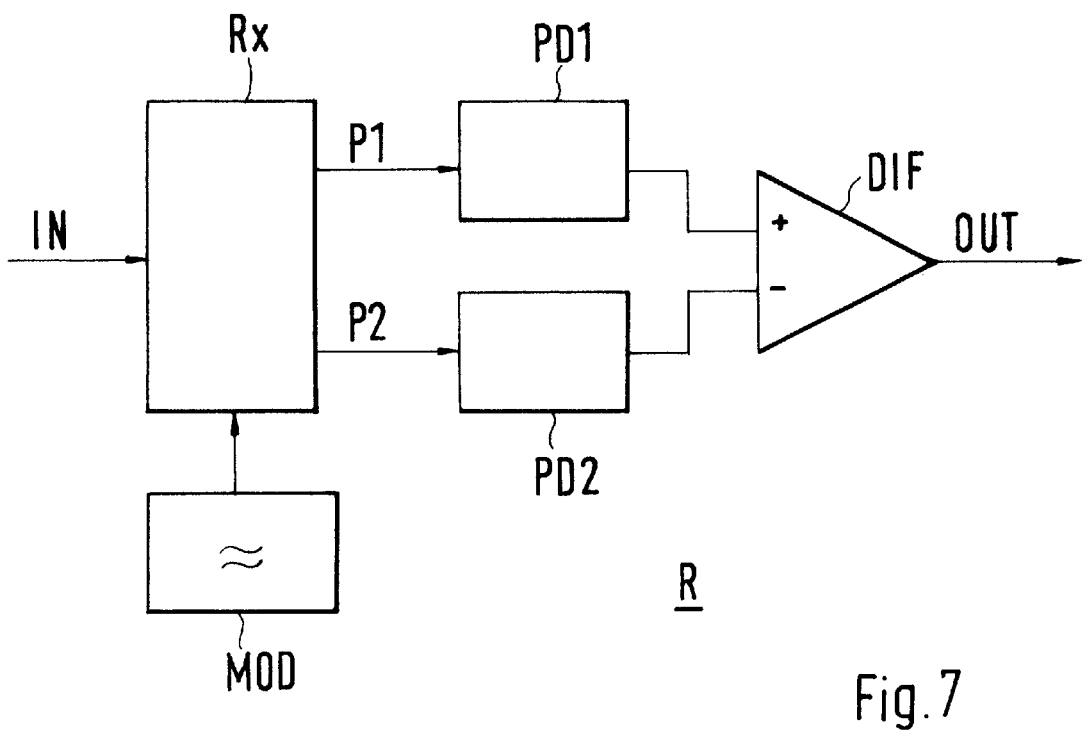
FIG. 7 shows a development of the receiver of FIG. 6.

A development of the second embodiment is shown in FIG. 7. This development uses a filter Rx with two outputs P1, P2 which provide complementary output signals. "Complementary" as used here means that the sum of the two output signals gives the input signal. The two output signals are converted by two separate detector units PD1, PD2 to electric signals which are then subtracted from one another in a differential amplifier DIF. This has the advantage that crosstalk from other channels is reduced.

If a Fabry-Perot interferometer is used, the two complementary output signals are the transmitted and reflected portions of the signal received from the communications network. The reflected portion may be extracted from the optical fiber connected to the input IN by means of a splitter. Then it is advantageous to provide a variable attenuator between the output for the reflected signal portion and the differential amplifier. If a Mach-Zehnder interferometer is used, the two complementary output signals are the portions of the received signal from the two output arms of the interferometer.

Figure 8:
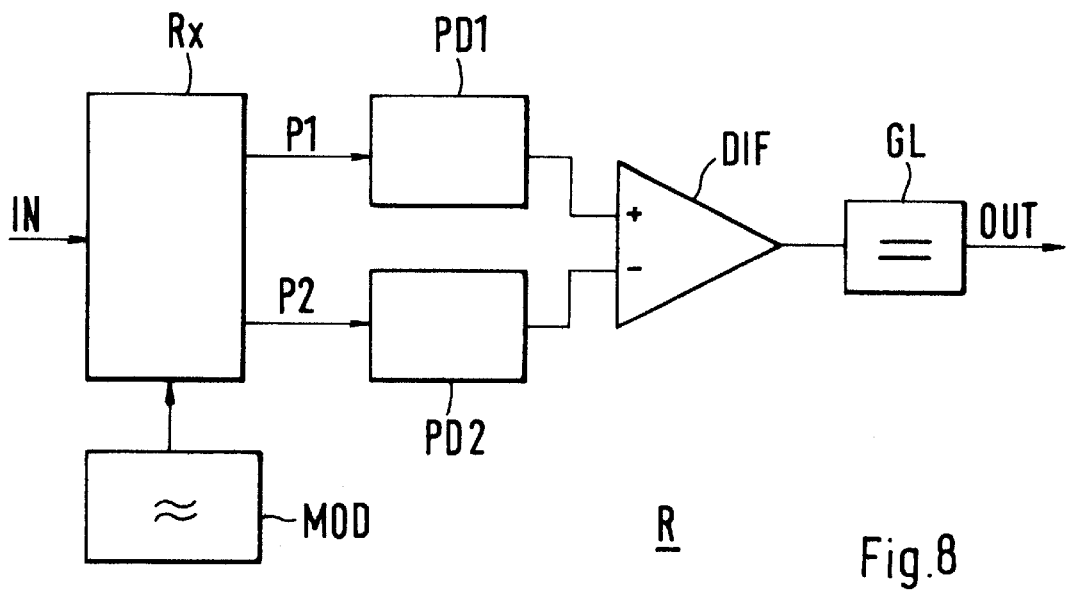
FIG. 8 shows a development of the receiver of FIG. 7.

Since the differential amplifier provides a bipolar output signal, a rectifier GL will advantageously be connected to its output. This development is shown in FIG. 8.

Figure 9:
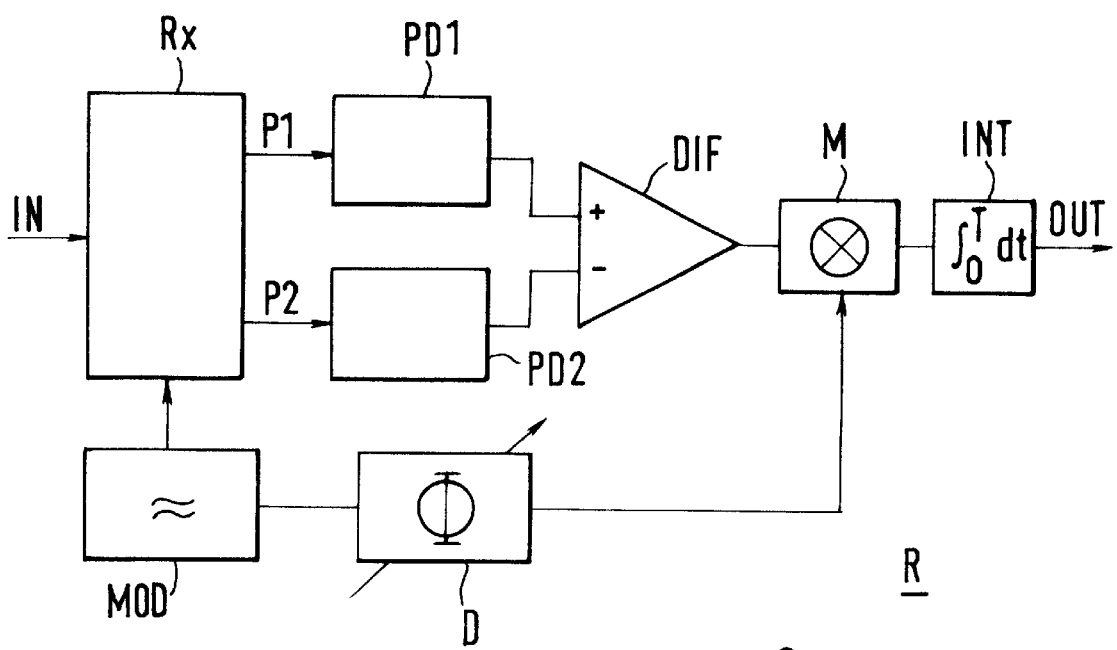
FIG. 9 shows a development of the receiver of FIG. 8.

A particularly simple implementation of the rectifier is illustrated in FIG. 9. The rectifier includes a multiplier M and an integrator INT. The multiplier M multiplies the bipolar output signal from the differential amplifier DIF by the frequency signal from the modulator. The frequency signal is the same signal with which the filter Rx was modulated. By in-phase multiplication of this frequency signal by the output signal from the differential amplifier DIF and subsequent integration with the integrator INT, rectification of the output signal is achieved. To ensure in-phase multiplication, a variable phase shifter D is connected between the modulator MOD and the multiplier M. The integrator INT integrates the output of the multiplier M over a period of time equal to one period of the bit rate of the received signal.

The invention lies in the fact that steps are taken to ensure that, when the receiver filter is detuned relative to a nominal transfer function, a smaller decrease in received power is achieved than with conventional arrangements. When the filter transfer function drifts from the nominal transfer function, the received power passes not through the tuning curve with numerous sharp minima and maxima, but only through the envelope of this curve.

For a Mach-Zehnder interferometer, the transfer function T(f), i.e., the mathematical expression that relates the output and input of the filter as a function of frequency, is given by $$T(f) \propto 1 + \cos(2\pi f \tau) \qquad (1)$$

where $\tau$ is the roundtrip time of the filter.

If other filters, such as a Fabry-Perot interferometer or an arrayed waveguide grating, are used, a similar relation holds true, as can be shown by expansion into a Fourier series. This only results in higher terms in $\tau$, which cause small deviations from the tuning curve described in the following.

The optical power received in the receiver is given by $$P_{Rx} = \int_0^\infty S(f) \cdot T_{Tx}(f) \cdot T_{Rx}(f) \cdot df \qquad (2)$$

where $T_{Tx}(f)$ is the transfer function of the transmitter filter, $T_{Rx}(f)$ is the transfer function of the receiver filter, and S(f) is the spectral distribution of the signal light source in the transmitter. From Relations (1) and (2) it can be derived that the tuning curve, i.e., the curve according to which the total received power decreases as the receiver filter is tuned away from the transmitter filter (nominal transfer function), is the cosine transform of the spectral distribution of the signal light source.

Figure 10A:
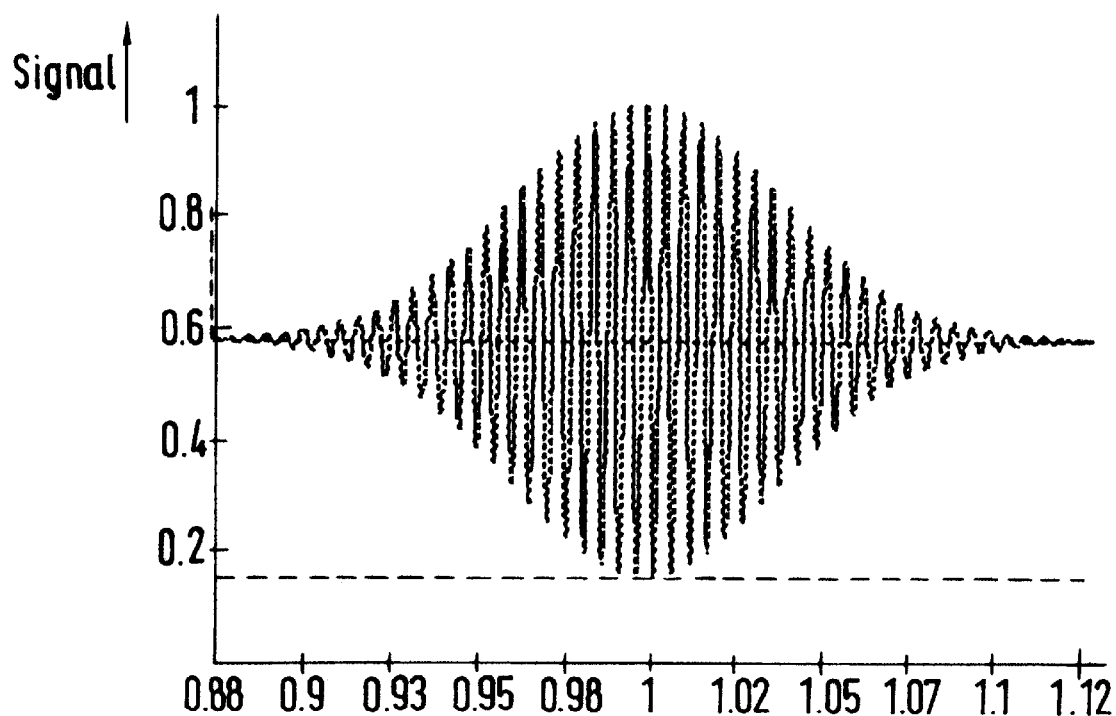
FIG. 10a is a first curve showing the received power when tuning the receiver filter.

This tuning curve is shown in FIG. 10*a* for a Gaussian If spectral distribution of the signal light source. The abscissa represents the detuning of the receiver filter relative to the transmitter filter, expressed as the quotient of the roundtrip times of the filters, $\tau_{Rx}/\tau_{Tx}$. The ordinate represents the received power normalized to the total output of the light source. The tuning curve shows distinct, sharp maxima and minima, while the envelope of the tuning curve tends only slowly toward a mean value, which can be deducted as a constant offset.

The tuning curve shows that even if the receiver filter is detuned only slightly, e.g. due to temperature variations, a dramatic decrease in received power occurs, which would result in a loss of signal at the receiver.

Figure 10B:
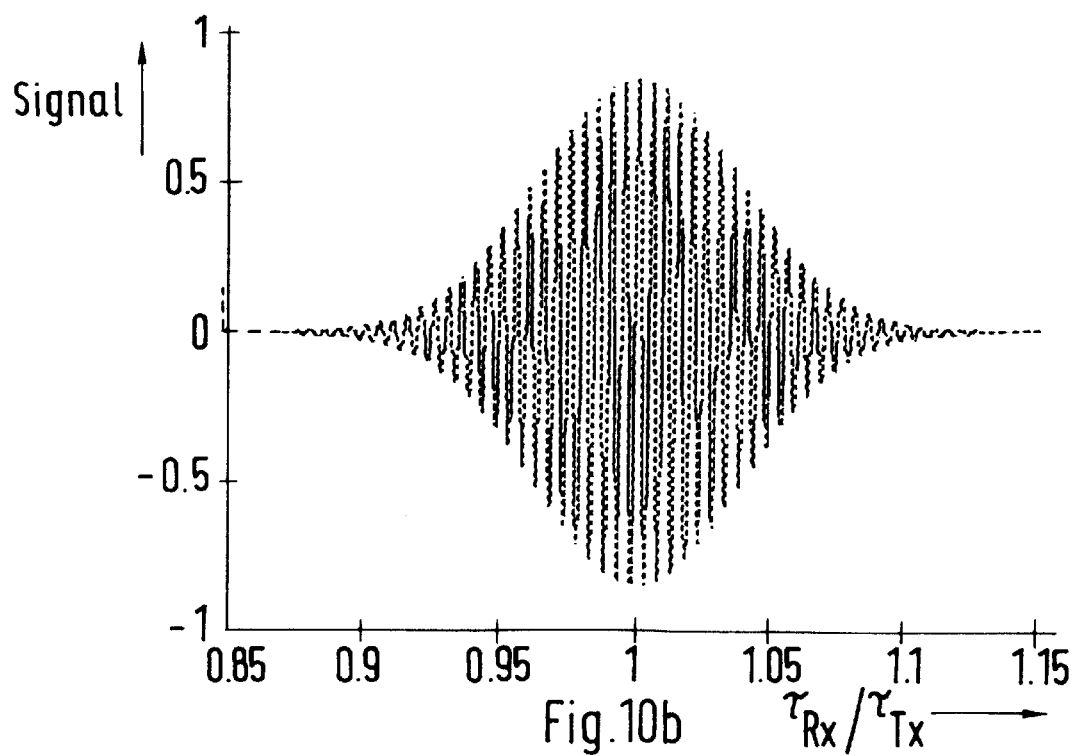
FIG. 10b is a second curve showing the received power when tuning the receiver filter.

FIG. 10*b* shows the tuning curve for the case of a bipolar output signal if the differential amplifier shown in FIG. 5 and FIGS. 7–9 is used to reduce crosstalk.

The basic idea of the invention is to provide measures which, when the receiver filter is detuned, cause the received power to pass not through the tuning curve shown in FIG. 10*a* or 10*b*, but through the envelope of this curve. In this manner, losses of signal caused by the sharp minima of the tuning curve are avoided.

This is accomplished by using a second filter. When the receiver filter is detuned, the signal portion passed by this second filter passes through a second tuning curve. As can be seen from FIGS. 10a and 10b, the function below the envelope of the tuning curve is a cosine function. The second filter is so detuned relative to the first that its tuning curve is shifted by one quarter-period of this cosine function with respect to the tuning curve of the first filter. This corresponds to a phase shift of the cosine function by n/4, which gives a sine function, as is well known. From the general relation $$(\cos x)^2 + (\sin x)^2 = 1 \text{ for all } x \in R \quad (3)$$

it follows that the envelope of the tuning curves is obtained by squaring and subsequently adding the two signal components provided by the two filters.

Figure 11:
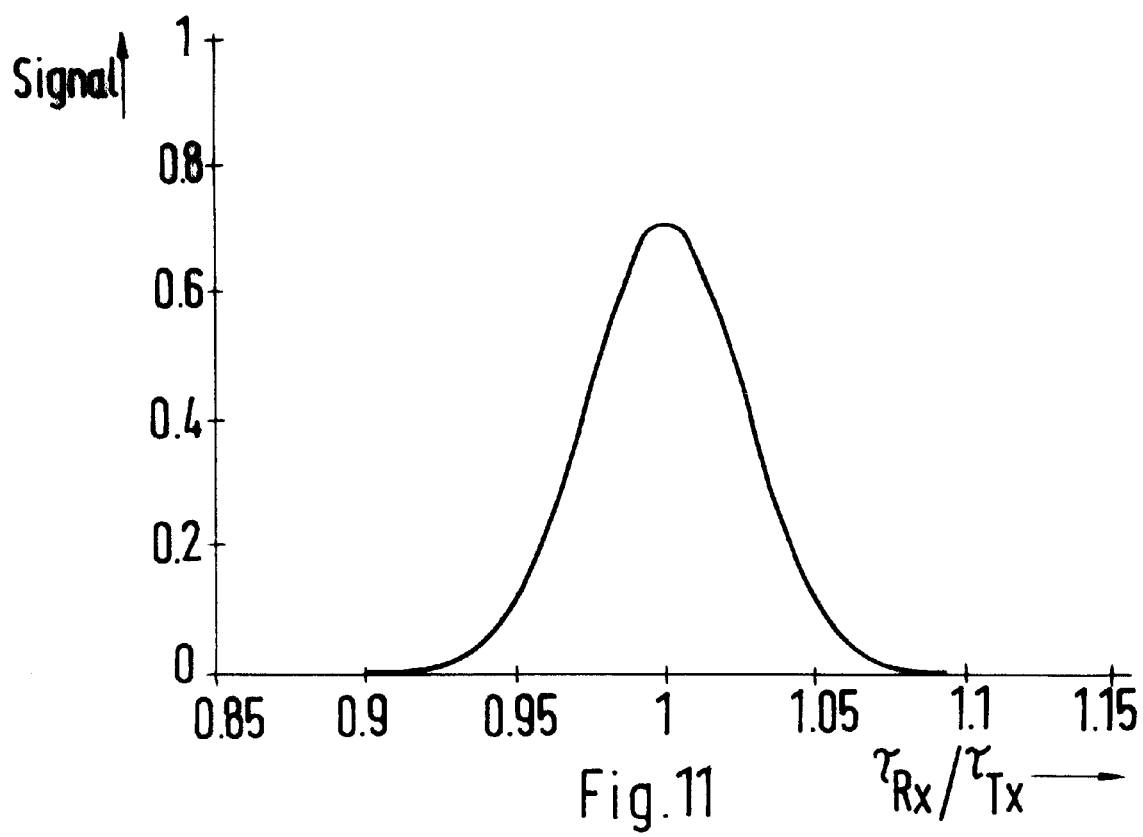
FIG. 11 is a third curve showing the received power when tuning the receiver filter.

FIG. 11 shows a measured curve which illustrates this. Like Figs. 10a and 10b, it shows the received power (signal), normalized to the total output of the light source, versus the detuning ($\tau_{Rx}/\tau_{Tx}$) of the receiver filter relative to the transmitter filter. The curve was recorded with the setup shown in FIG. 5 and represents the envelope of the tuning curve of FIG. 10b.

Alternatively, passage through this envelope in case of detuning of the receiver filter is achieved by modulating the filter of the receiver at a frequency greater than the bit rate of received signals, and by subsequent integration over one bit period. This ensures that during the period of each received bit, a maximum of the tuning curve is traversed at least once.

In a transmission method according to the invention, modulated light signals, generated by a directly modulated, broadband light source, for example, are first encoded with a periodic transmitter filter. The encoded light signals are transmitted over a communications network and are decoded by means of a receiver filter and converted to electric signals by means of the detector unit in a receiver of any of the designs described above.

This transmission method has the special advantage that in the transmitter, too, no expensive control is necessary for the transmitter filter, since the transfer function of the transmitter filter also needs to be stable within only about ±1%. Thus, the improvement in the receiver according to the invention also permits a reduction of the complexity and cost of the transmitter.

What is claimed is:

1. A receiver (R) for an optical communications system for transmitting in coded optical signals, comprising a first optical detector unit (PD1) preceded by a first periodic optical filter (Rx1), characterized by a second periodic optical filter (Rx2) whose roundtrip time is shifted with respect to the roundtrip time of the first filter by approximately one quarter of the mean lightwave period of the received signal, an optical splitter (KOP) via which the inputs of the first and second filters (Rx1, Rx2) are connected to the input (IN) of the receiver (R), a second optical detector unit (PD2) following the second periodic optical filter (Rx2), two squarers (Q1, Q2), each following a respective one of the two optical detector units (PD1, PD2), for squaring the amplitudes of the respective signals applied to them, and an adder (AD) for adding the output signals of the two squarers (Q1, Q2).

2. A receiver (R) as claimed in claim 1 wherein at least the first filter (Rx1) has, in addition to a first output (P11) connected to the first optical detector unit (PD1), a second output (P12) whose signal is complementary to the signal of the first output (P11) and which is connected to a third optical detector unit (PD3), and which further comprises a differential amplifier (DIF1) which subtracts the output of the third optical detector unit (PD3) from the output of the first optical detector unit (PD1).

3. A receiver as claimed in claim 2 wherein the filter (Rx1, Rx) is a Fabry-Perot interferometer, and wherein the signals of the first output (P11, P1) and the second outputs (P12, P2) are, respectively, the transmitted portion and the reflected portion of the received signal.

4. A receiver as claimed in claim 2 wherein the filter (Rx1, Rx) is a Mach-Zehnder interferometer, and wherein the two output signals are the two portions of the received signal from the two output arms of the Mach-Zehnder interferometer.

5. A method of transmitting coded optical signals in an optical communications system, comprising the steps of coding the optical signal in a transmitter (T) by means of a transmitter filter (Tx) and decoding it and converting it to a first electric signal in a receiver (R) by means of a first periodic optical filter (Rx1) and a first detector a unit (PD1), respectively, characterized in that prior to the decoding, the coded optical signal is split up by means of an optical splitter (KOP) and fed to the first periodic optical filter (Rx1) and a second periodic optical filter (Rx2) whose roundtrip time is shifted with respect to the roundtrip time of the first optical filter (Rx1) by approximately one quarter of the mean light-wave period of the received signal, that the signal portion filtered in the second periodic optical filter (Rx2) is converted into a second electric signal by means of second detector unit (PD2), that the amplitudes of the first and second electric signals are squared by means of a first squarer (Q1) and a second squarer (Q2), respectively, and that the two squared electric signals are added by means of an adder (AD).

* * * * *

UNITED STATES PATENT AND TRADEMARK OFFICE
CERTIFICATE OF CORRECTION

PATENT NO.    : 6,404,528 B1
DATED         : June 11, 2002
INVENTOR(S)   : Thomas Pfeiffer It is certified that error appears in the above-identified patent and that said Letters Patent is hereby corrected as shown below:

Title page,
Item [56], References Cited, "Mizutani, 5,742,241" should be -- 5,742,418 --.
Foreign Application Priority Data is not listed; should be
-- DE    197   22   370.2   5/1997 --.
Item [57], ABSTRACT,
Line 1, "a" should be deleted.

Column 7,
Line 46, "in" should be deleted.

Column 8,
Line 36, "a" should be deleted. (second occurrence)

Signed and Sealed this

Tenth Day of December, 2002

JAMES E. ROGAN
*Director of the United States Patent and Trademark Office*